United States Patent [19]

Bartlett et al.

[11] Patent Number: 4,556,361
[45] Date of Patent: Dec. 3, 1985

[54] OPENER APPARATUS AND SYSTEM UTILIZING SAME

[75] Inventors: Donald S. Bartlett, Troy; John A. Boback, Warren; Thomas M. Powell, Dryden, all of Mich.

[73] Assignee: GMFanuc Robotics Corporation, Troy, Mich.

[21] Appl. No.: 574,472

[22] Filed: Jan. 27, 1984

[51] Int. Cl.⁴ ............................................. B25J 5/02
[52] U.S. Cl. .................... 414/744 A; 414/917; 901/7; 901/43
[58] Field of Search ............. 414/744 A, 919; 901/6, 901/7, 22, 43

[56] References Cited

U.S. PATENT DOCUMENTS 3,630,391 12/1971 Wilson ........................... 414/744 A
4,342,535 8/1982 Bartlett et al. ................. 414/744 A
4,342,536 8/1982 Akeel et al. .................... 414/744 A
4,423,999 1/1984 Choly ............................. 414/744 A Primary Examiner—William A. Cuchlinski, Jr.
Attorney, Agent, or Firm—Brooks & Kushman

[57] ABSTRACT

A vehicle door opener apparatus positioned in a work station such as a paint booth includes a rotary arm with its pivot axis substantially aligned with the door hinge axis in open and closed positions of the door. Harmonic control linkage provides smooth acceleration and deceleration of the door. A fixture pin is mounted on the lower surface of each door of the vehicle body for engagement by a gripper mechanism comprising a pair of elongated rail members supported on the free end of the arm. The rail members receive the fixture pin upon movement of the vehicle body into the work station. A system utilizing the apparatus includes a hydraulic power supply and a manifold assembly. The manifold assembly includes a solenoid valve which controls a rotary actuator of the apparatus in an on-off manner. The rotary actuator powers a drive link of the control linkage. Magnetic proximity switches provide status signals to a programmable controller which controls the solenoid valve. The switches not only indicate the open or closed status of the opener arm, but also indicate the presence of the fixture pin between the rail members.

14 Claims, 6 Drawing Figures

OPENER APPARATUS AND SYSTEM UTILIZING SAME

TECHNICAL FIELD

This invention relates to apparatus and systems for moving hinged members and, in particular, to apparatus and systems for automatically moving doors on vehicle bodies between open and closed positions.

BACKGROUND ART

U.S. Pat. Nos. 4,343,536 to Bartlett et al and 4,342,536, to Akeel et al disclose apparatus for opening and closing doors on a vehicle body during the painting of the vehicle body by a robot. The apparatus includes primary and auxiliary arms mounted on a carriage. The apparatus is taught to follow the vehicle body as it moves through a painting station. During this tracking operation, the secondary arm of the apparatus is extended to engage a fixture mounted to a door of the vehicle body. The door is opened by driving the fixture through an arc predetermined by the relationship between the fixture and the door hinge axis. The apparatus includes hydraulic motors, servo valves, resolvers, gear boxes, a pneumatic cylinder and a control valve. Considerable electronics are involved in the control portion of the apparatus to provide continuous feedback and command signals. The electronics also contains therewithin the various paths corresponding to various body style door configurations. Numerous electrical, hydraulic and pneumatic lines extend to the moving parts of the apparatus.

DISCLOSURE OF THE INVENTION

An object of the present invention is to provide an apparatus and a system for moving a hinged member of a vehicle body about a hinge axis at a work station wherein the apparatus includes an arm and control linkage for smoothly accelerating and decelerating the arm so that the hinged member is moved in a relatively smooth fashion.

Another object of the present invention is to provide a system including apparatus for moving a hinged member of a vehicle body about a hinge axis at a work station wherein a control mechanism of the system is relatively simple and is compatible with digital control systems and does not require the introduction of high power level electrical circuits to the work station nor numerous electrical, hydraulic nor pneumatic lines to any moving members of the apparatus.

Yet still another object of the present invention is to provide an apparatus for moving a hinged member of a vehicle about a hinge axis at a work station wherein a gripper mechanism of the apparatus is adaptable to different vehicle body styles and to various tolerances.

In carrying out the above objects and other objects of the present invention, the apparatus for moving a hinged member of a vehicle body about a hinge axis at a work station includes a base and an arm having one end thereof mounted on the base for rotary movement about a first pivot axis. A gripper mechanism is mounted on the free end of the arm and is adapted to seizing and releasing the hinged member. The apparatus also includes a motor including an actuator shaft rotatable about a second pivot axis spaced apart from the first pivot axis. Control linkage is connected to the actuator shaft for transferring rotary motion of the actuator shaft to rotate the arm. The control linkage translates rotation of the actuator shaft at a substantially constant angular velocity to rotation of the arm at a substantially sinusoidal angular velocity. In this way the arm is accelerated and decelerated to move the hinged member in a relatively smooth fashion after the gripper mechanism seizes the hinged member.

A system for opening and closing hinged members of vehicle bodies at a work station includes a base and an arm having one end thereof mounted on the base for rotary movement about a first pivot axis. A gripper mechanism is mounted on the free end of the arm and is adapted for seizing and releasing the hinged member. The system also includes a motor including an actuator shaft rotatable about a second pivot axis spaced apart from the first pivot axis. Control linkage is connected to the actuator shaft for transferring the rotary motion of the actuator shaft to rotate the arm. The control linkage translates rotation of the actuator shaft at substantially constant angular velocity to rotation of the arm at a substantially sinusoidal angular velocity. The apparatus also includes control means for controlling the operation of the motor and feedback means associated with the gripper mechanism and the control linkage for providing feedback signals to the control means which indicate the condition of the gripper mechanism and the control linkage, respectively. The arm is accelerated and decelerated to move the hinged member in a relatively smooth fashion after the gripper mechanism seizes the hinged member.

Preferably, the control linkage includes an elongated drive link connected at one end thereof to the actuator shaft for pivotal movement about the second pivot axis and a bent drag link having one end thereof mounted at the opposite end of the drive link for pivotal movement about a third pivot axis. The drag link includes an elongated bottom portion. The longitudinal axes of the bottom portion and the drive link are substantially aligned in the open and closed positions of the arm which, in turn, corresponds to the open and closed positions of the hinged member. The control linkage further includes an output link having one end thereof mounted on the opposite end of the drag link for pivotal movement about a fourth pivot axis. The third and fourth pivot axes move along arcuate paths upon rotation of the drive link. The opposite end of the output link and the one end of the arm are connected to an output shaft to rotate therewith.

Also, preferably, the gripper mechanism includes a pair of opposing rail members, which are adapted to receive and retain therebetween at least a part of the hinged member upon movement of the vehicle body into the work station. The rail members include outwardly opening jaw portions for guiding the part of the hinged member therebetween. A spring mechanism is operatively connected to one of the rail members to permit the one rail member to move away from the other rail member upon receiving the part of the hinged member and to bias the part of the hinged member towards the other rail member.

Yet, still preferably, the arm includes open and closed positions which correspond to the open and closed positions, respectively, of the hinged member. The first pivot axis is substantially aligned with the hinge axis of the hinged member when the gripper mechanism retains at least part of the hinged member in both the open and closed positions. In this way the arm and hinged member go through substantially the same motions between the open and closed positions. The base is adapted to be mounted at the work station so that in the closed position of the arm, the longitudinal axis of the arm is substantially parallel to the path taken by the hinged member as the vehicle body moves into the work station. The longitudinal axes of the rail members extend parallel to the longitudinal axis of the arm.

The feedback means of the system preferably includes a switch operatively associated with at least part of the gripper mechanism to indicate the presence of the part of the hinged member retained in the gripper mechanism. The feedback means also includes at least one switch operatively associated with the control linkage to indicate the open and closed positions of the arm corresponding to open and closed positions of the hinged member, respectively.

The apparatus and system of the present invention require relatively simple controls to operate in a smooth fashion. The system and apparatus have a relatively low cost yet are adaptable to various body styles and tolerances.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
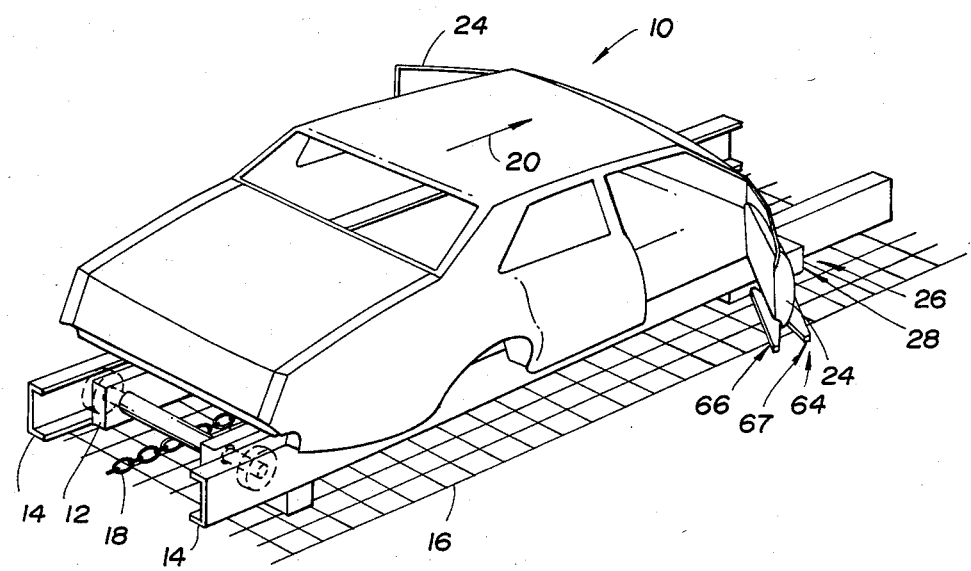
FIG. 1 is a perspective view showing a sheet metal vehicle body positioned in a work station in relation to a door opener apparatus made in accordance with the present invention.

Referring to the drawings and more particularly to FIG. 1, a vehicle body, generally indicated at 10, made of sheet metal is shown mounted on a carrier 12 and being conveyed along tracks 14 through a conventional paint booth structure, a part of which is shown at 16. A traveling conveyor chain 18 is fastened to the carrier 12 and causes the carrier 12 to move in the direction indicated by an arrow 20 into the paint booth.

Figure 5:
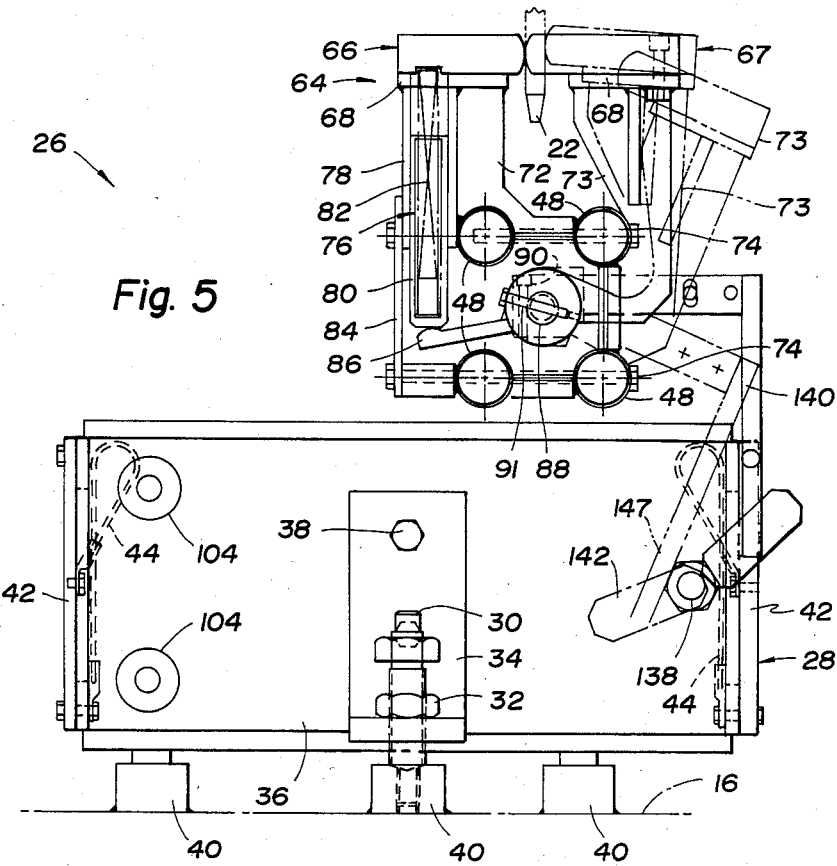
FIG. 5 is an end view, partially broken away, of the apparatus of FIGS. 3 and 4 and illustrating different operative positions of a gripper mechanism of the apparatus.
Figure 6:
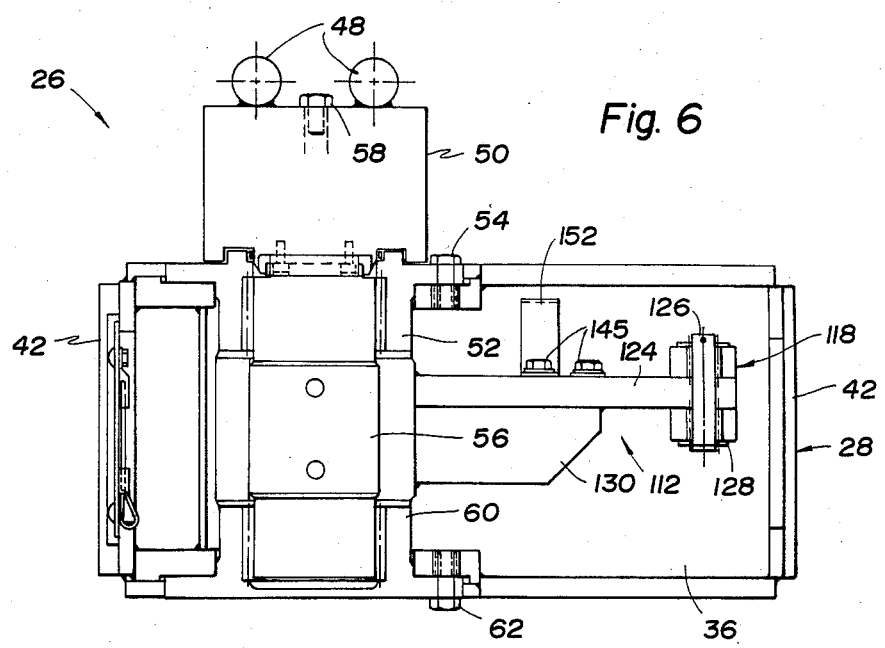
FIG. 6 is an end view, partially broken away, of the apparatus opposite the end view of FIG. 5.

A vertically extending door rod or fixture pin 22, as shown in FIG. 5, is removably mounted at the bottom surface of each door 24 of the vehicle body 10. A door opener apparatus, generally indicated at 26, seizes the pin 22 and moves the door 24 about its hinged connection or hinge axis to a door-open position so that, for example, the inside of the door 24 can be painted by a paint robot (not shown) during the painting operation of the vehicle body 10. Thereafter, the door 24 is closed by the door opener apparatus 26 and the rod 22 is released. The apparatus 26 then returns to a ready position to await the arrival of another vehicle body for repeating the door opening and closing operation.

Referring now to FIGS. 3 through 6, the apparatus 26 includes an aluminum base or housing, generally indicated at 28. The housing 28 is adjustably mounted to the booth structure 16 by leveling screws and bolts 30 and 32, respectively. The leveling screws 30 extend through L-shaped mounting brackets 34 which are fixedly mounted to the end walls 36 of the housing 28 by bolts 38. The mounting screws 30 also extend into mounts 40 which are fixedly secured to the booth structure 16 such as by welding.

The base 28 includes a pair of side access covers 42 to permit maintenance and adjustment of the apparatus 26 therewithin. Retaining cables 44 which are secured to the access covers 42 and the remainder of the housing 28 minimize the chance of losing the access covers 42.

The apparatus 26 also includes an opener arm, generally indicated at 46, which comprises an assembly of spaced, elongated, aluminum tubes 48 welded to a rotary block 50 at the top of the housing 28. The rotary block 50 is rotatably and sealingly mounted on an upper bushing 52 which, in turn, is bolted to a top plate of the housing 28 by bolts 54. The connection between the block 50 and the bushing 52 has a labyrinth construction such that cleaning sprays do not impinge directly on the seals therebetween.

The block 50 is mounted on a steel output shaft 56 by a pair of mounting bolts 58 to rotate therewith. The output shaft 56 is mounted for rotation within the housing 28 by the upper bushing 52 and also by a lower bushing 60 which, in turn, is bolted to a bottom plate of the housing 28 by bolts 62.

A rail assembly or gripper mechanism, generally indicated at 64, is mounted on the free end of the opener arm 46. The gripper mechanism 64 is adapted to receive, retain and release the fixture 22 as shown in FIG. 5. The gripper mechanism 64 includes inner and outer, opposed, elongated rail members, generally indicated at 66 and 67, respectively. The rail members 66 and 67 include receiving and releasing jaws 63 and 65, respectively, to facilitate movement of the fixture pin 22 between and through the rail members 66 and 67. Each of the rail members 66 and 67 is bolted to a support 68 such as by bolts 70. The rail member 66 is fixedly mounted on the ends of the tubes 48 by vertically extending plates 72, through which the tubes 48 extend. The ends of the tubes 48 support a bushing 92 which, in turn, rotatably supports a shaft 88. The rail member 67 is mounted on the shaft 88 to rotate therewith by vertically extending plates 73. The free ends of the tubes 48 are interconnected and are connected to the bushing 92 by mounting bolts 74. Mounting holes 61 formed through the tubes 48 allow the position of the gripper mechanism 64 to be adjusted on the tubes 48 to accommodate different body styles.

The outer rail member 67 is spring-loaded by a spring mechanism, generally indicated at 76, through a link 86 which is mounted to the shaft 88 by a bolt 91. The spring mechanism 76 includes a cylinder 78 which is fixedly mounted on a lower surface of the support 68 of the inner rail member 66. The spring mechanism 76 also includes a hollowed out piston 80 slidably received within the cylinder 78. The mechanism 76 includes a spring 82 in the cylinder 78 and the piston 80 for biasing the piston 80 away from the cylinder 78. An access cover 84 is bolted by the bolts 74 to the ends of the tubes 48 to protect the spring mechanism 76. Movement of the spring-loaded outer rail member 67, as shown in FIG. 5, causes the link 86 to move the piston 80 upward against the biasing action of the spring 82.

Because the outer rail member 67 is spring-loaded, the rail members 66 and 67 provide tolerance to various fixture locations in a lateral direction. The length of the rail members 66 and 67 provides longitudinal tolerance and the straight shank length of the fixture pin 22 provides height tolerance.

Preferably, the inner opposing facing surfaces of the rail members 66 and 67 are coated with a long-wearing, non-sparking, high density plastic which is easily cleaned and which facilitates fixture pin travel through the rail members 66 and 67. Also, the plastic coating facilitates sliding of the pin 22 between the rail members 66 and 67 during the operation of the apparatus 26 if the hinge axis of the door 24 is not precisely aligned with the axis of rotation of the arm 46.

The apparatus 26 also includes a motor, comprising a rotary actuator, generally indicated at 96. The rotary actuator 96 includes an actuator shaft 98 which rotates about a pivot axis spaced apart from the pivot axis about which the opener arm 46 rotates. The rotary actuator 96 preferably comprises a pneumatic or hydraulic drive unit with a 180° range of travel. The rotary actuator 96 is hydraulically powered from a pair of hydraulic lines 102 (FIG. 2) which extend through the housing 28 through bulkhead fittings 104 for connection to the rotary actuator 96 by connectors 106.

Figure 2:
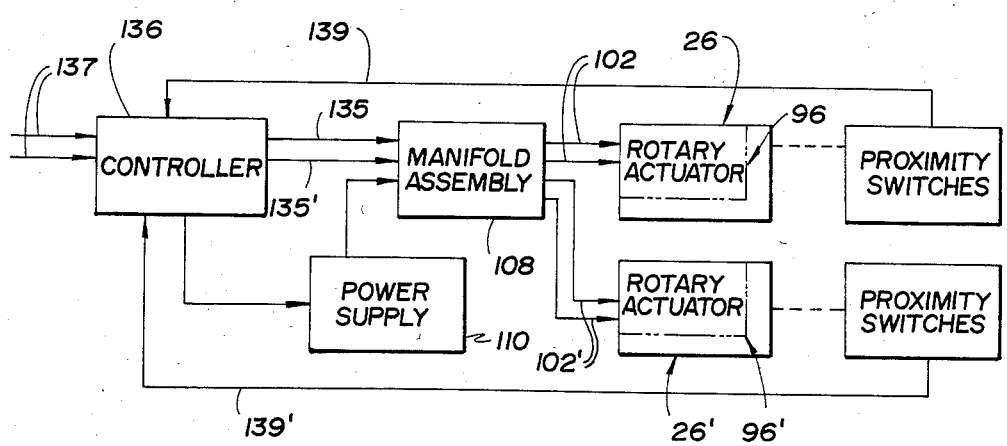
FIG. 2 is a schematic diagram of a system showing the door opener apparatus combined with control components.
Figure 3:
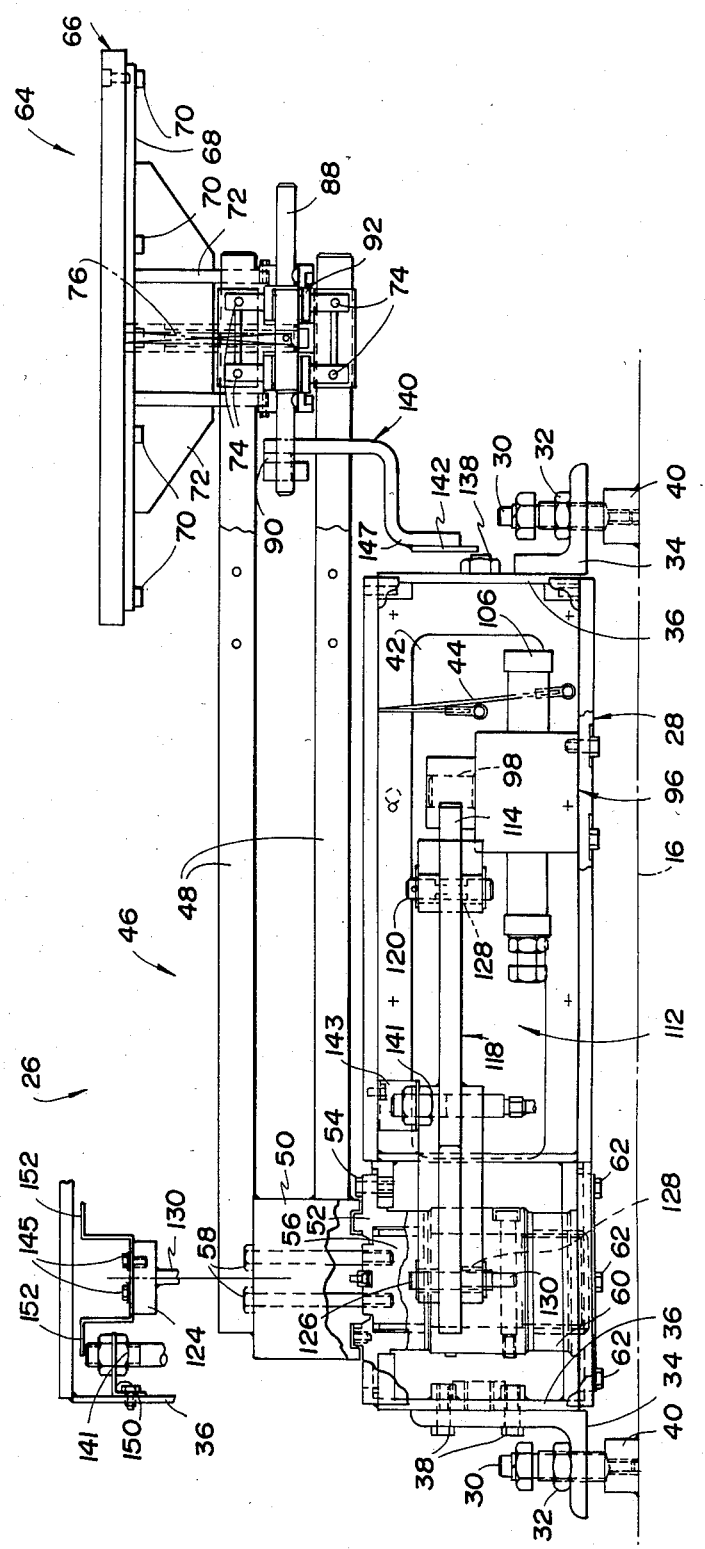
FIG. 3 is a partially exploded, side elevational view, partially broken away, illustrating the door opener apparatus.

The hydraulic lines 102 extend from a module in a manifold assembly 108 as shown in FIG. 2. The manifold assembly 108 includes a plurality of modules, one for each apparatus 26. As shown in FIG. 2, a pair of apparatus 26 and 26' are illustrated for opening a pair of doors on opposite sides of a motor vehicle. However, it is to be understood that four such door opener apparatus 26 may be provided for a four-door car, wherein the fixture bolts connected to the front doors move through and between the rail members of the apparatus for the rear doors before they are finally received and retained within the rail members for the front doors. This is accomplished by positioning each housing 28 so that in the closed position of each arm 46 the longitudinal axes of the arms and the rail members 66 are substantially parallel to the paths taken by the doors 24 as the vehicle body 10 moves into the work station.

Each module of the manifold assembly 108 comprises an electro-hydraulic, spring-centered, solenoid operated, four-way valve with manual override capability. Each module also includes a metering valve block for controlling the opening and closing velocities of the mechanism. The module further includes a fixed sandwich orifice which reduces start-up shock. A hydraulic power supply 110 is also provided for supplying the hydraulic fluid under pressure.

Figure 4:
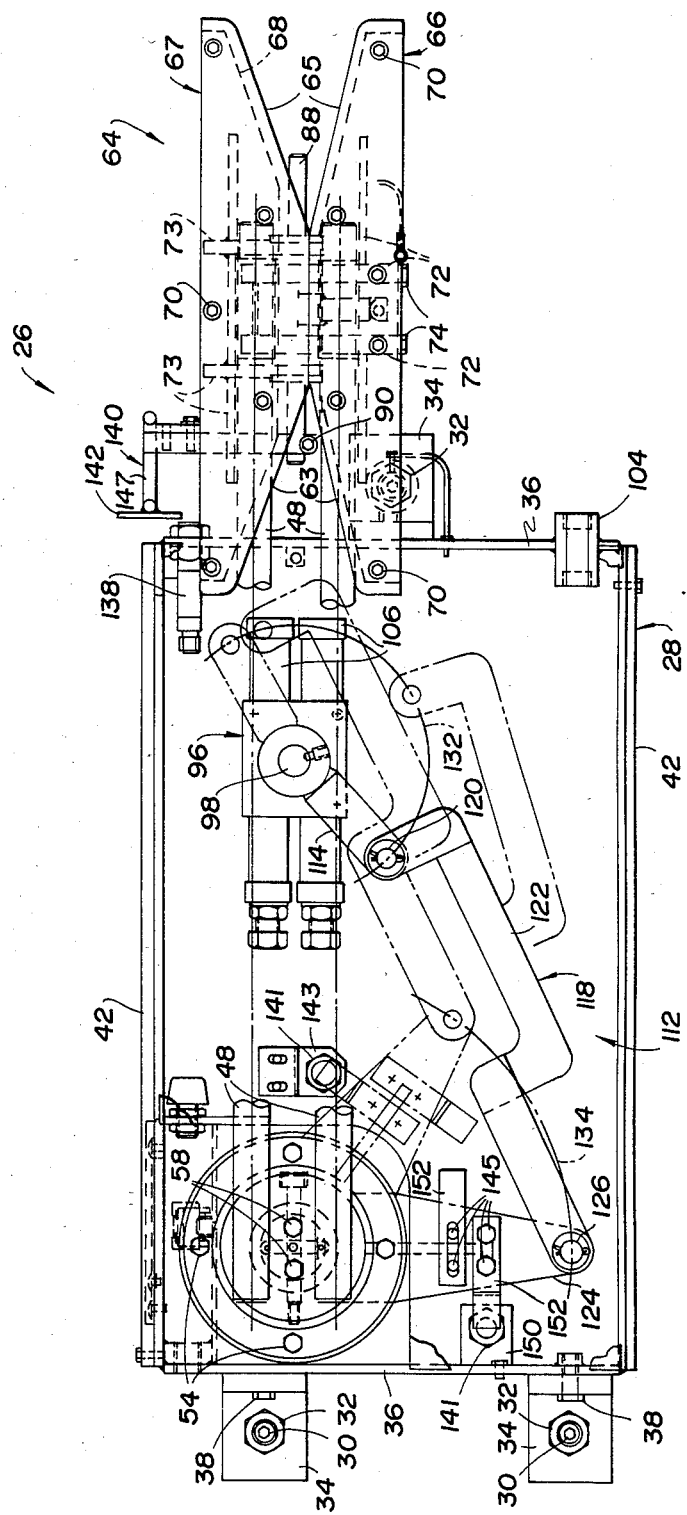
FIG. 4 is a top plan view, partially broken away, of the apparatus of FIG. 3 and illustrating different operative positions of control linkage of the apparatus.

As best shown in FIG. 4, each apparatus 26 also includes control linkage, generally indicated at 112, which is connected to the actuator shaft 98 for transferring rotary motion of the actuator shaft 98 to rotate the opener arm 46. The control linkage 112 translates rotation of the actuator shaft 98 (which is controlled in an on-off fashion by its respective module of the manifold assembly 108) which rotates at a relatively constant angular velocity, to a rotation of the opener arm 46 at a substantially sinusoidal angular velocity. In this way, the opener arm 46 is accelerated and decelerated to move the door 24 in a relatively smooth fashion after the rail members 66 and 67 have seized the pin 22 on the door 24.

The control linkage 112 includes an elongated steel drive link 114 which is mounted at one end thereof to the actuator shaft 98. The control linkage also includes a U-shaped, steel drag link, generally indicated at 118 and having clevis ends. One clevis end of the drag link 118 is mounted to the opposite end of the drive link 114 by a pin, which preferably comprises a shear pin 120 to prevent overloading of the control linkage 112. The drag link 118 includes an elongated bottom portion 122. The longitudinal axes of the bottom portion 122 and the drive link 114 are substantially parallel at each end of travel of the drive link 114 which travels through approximately 180° under control of the manifold assembly 108.

The opposite clevis end of the drag link 118 is pivotally connected to a steel output link or arm 124 by a clevis pin 126. Each of the pins 120 and 126 are supported by needle roller bearings 128 which are lubricated upon assembly of the control linkage 112.

The opposite end of the output link 124 is connected to the output shaft 56 to rotate therewith. The output link 124 is supported on the output shaft by a steel plate 130 which is welded to the shaft 56 and the link 124.

The opposite clevis ends of the drag link 118 define third and fourth pivot axes which move along arcuate paths 132 and 134, respectively. When the third pivot axis moves through an angle of approximately 180°, the fourth pivot axis moves through an angle of approximately 55°. This is due to the parallel alignment of the longitudinal axes of the bottom portion 122 of the drag link 118 and the drive link 114 at each end of drive link travel which corresponds to the open and closed positions of the opener arm 46. Consequently, large input movement at the start and finish of travel of the drive link 114 results in only a relatively small output movement of the output arm 124 and smooth acceleration and deceleration of the opener arm 46.

Referring now to FIG. 2, a system for opening and closing the doors 24 of the vehicle body 10 at the work station includes the apparatus 26 and further includes the manifold assembly 108, the power supply 110 and a controller 136 which is preferably programmable. The controller 136 controls the manifold assembly 108 to, in turn, control one or more apparatus 26 and 26'. The primed designation on all structure illustrated in FIG. 2 indicates a second apparatus substantially identical to the non-primed structure.

The controller 136 is responsive to signals, for example, from a robot controller or other controller along lines 137. The controller 136 provides digital electrical signals to the valve of the particular module of the assembly 108 along lines 135 to control the valve.

The controller 136 receives electrical feedback signals along lines 139 to monitor the status of the rail members 66 and 67 and also the status of the opener arm 46 (i.e. whether open or closed, which, in turn, corresponds to the open and closed positions, respectively, of the car door 24). Switches or sensors, which preferably comprise proximity switches 138 and 141, provide the electrical feedback signals. Each of the proximity switches 138 and 141 preferably comprises a magnetic proximity switch which is hermetically sealed. The switches are configured as normally open switches with a common ground and include current-limited sense circuitry.

The proximity switch 138 (i.e. "fixture-present switch) associated with the outer rail member 67 indicates the presence of the fixture pin 22 retained between the rail members 66 and 67. Rotation of the outer rail member 67 causes the shaft 88 to rotate, thereby moving an adjustable, S-shaped arm generally indicated at 140. The arm 140 is adjustably mounted on the shaft 88 by a bolt 90. A steel blade 142 is mounted on the free end 147 of the arm 140 which closes the switch 138 by moving towards the switch 138. The resulting signal emitted by the switch 138 is sent to the controller 136 for processing thereby.

A pair of proximity switches 141 are operatively associated with the control linkage 112 and, in particular, with the output arm 124 to indicate the open and closed positions of the opener arm 46 which, in turn, corresponds to the open and closed positions, respectively, of the door 24. A "closed-position", proximity switch 141 is mounted on one end wall of the housing 28 by a bracket 150. An "open-position", proximity switch 141 is mounted on the top plate of the housing 28 by a bracket 143. Stepped-shaped steel blades 152 are adjustably mounted on the output arm 124 by bolts 145. The blades 152 alternately open and close the proximity switches 141 upon movement of the opener arm 46 into its fully open or fully closed positions. Signals emitted by these two proximity switches 141 are also fed back to the controller 136 along line 139 for processing thereby for subsequent control of the apparatus 26 through the assembly 108.

OPERATION

During entry of the four-door vehicle body into the paint spray booth, the front door fixture pins pass through the rail members of the rear door opener apparatus and, consequently, into the rail members of the front door apparatus. When the vehicle body approaches its final position, all four fixture pins are engaged by their associated rail members. The outer rail members, being spring-loaded, move away from their respective inner rail members due to the motion of the fixture pins. This motion is sensed by the "fixture-present" switches. With the vehicle body in its final position and all "fixture-present" switches actuated, the opener arms are ready for operation. The programmable controller 136 actuates the hydraulic manifold assembly 108 to rotate the opener arms to their open positions. As the arms approach their "open" positions the "open-position" switches are actuated. At the "open" positions the hydraulics within the manifold assembly 108 are turned off by the controller 136.

Operation in a closing direction is similar to the operation in the opening direction. The hydraulics within the manifold assembly 108 are actuated by the programmable controller 136 opposite to the opening and each control linkage moves in the opposite direction. Each control linkage 112 closes its associated opener arm thereby deactivating its "open-position" switch as the control linkage leaves the "open" position and activates its "closed-position" switch as it comes into its "closed" position. Thereafter the hydraulics within the manifold assembly 108 are turned off by the controller 136.

Because the controls for each apparatus 26 are a simple on-off type, there is no requirement for the introduction of high power level electrical circuits to the work station. Also, since a single actuator such as the rotary actuator 96 is employed, no electrical, hydraulic nor pneumatic lines need to be routed to any moving members of the apparatus 26. Because of these features, the apparatus and system of the present invention have a relatively low initial cost, yet are highly reliable and require low maintenance.

Each harmonic control linkage provides relatively smooth acceleration and deceleration during the closing and opening portions of each cycle. The substantially constant rotation of each actuator shaft is translated into a nearly sinusoidal rotation of its associated arm. The elements of each control linkage may be designed to have high spring rates which would result in additional smoothness due to the resulting high natural frequency. Each fixture pin has a relatively low relative motion in relation to its capturing rail members during opening and closing to also contribute to the smooth operation of each apparatus. These features, consequently, result in relatively low force requirements to rotate the opener arms and reduce wear and maintenance of each opener apparatus.

While the invention has been described in an illustrative manner, it is to be understood that the terminology which has been used is intended to be in the nature of words of description rather than of limitation. Many modifications and variations of the present invention are possible in light of the above teachings. Therefore, it is to be understood that within the scope of the appended claims, the invention may be practiced otherwise unless specifically described.

What is claimed is:

1. An apparatus for moving a hinged member of a vehicle body about a hinge axis at a work station, the apparatus comprising:
    a base;
    an arm having one end thereof mounted on said base for rotary movement about a first pivot axis;
    a gripper mechanism mounted on the free end of said arm and adapted for seizing and releasing the hinged member;
    a motor including an actuator shaft rotatable about a second pivot axis spaced apart from the first pivot axis; and
    control linkage connected to said actuator shaft for transferring rotary motion of the actuator shaft to rotate said arm, wherein said control linkage translates rotation of the actuator shaft at a substantially constant angular velocity to a rotation of said arm at a substantially sinusoidal angular velocity whereby the arm is accelerated and decelerated to move the hinged member in a relatively smooth fashion after said gripper mechanism seizes the hinged member.

2. The apparatus as claimed in claim 1 wherein said control linkage includes an elongated drive link connected at one end thereof to said actuator shaft for pivotal movement about the second pivot axis.

3. The apparatus as claimed in claim 2 wherein said control linkage includes a bent drag link having one end thereof mounted at the opposite end of the drive link for pivotal movement about a third pivot axis and wherein the drag link includes an elongated bottom portion, the longitudinal axes of said bottom portion and said drive link being substantially parallel in open and closed positions of said arm corresponding to open and closed positions of the hinged member.

4. The apparatus as claimed in claim 3 wherein said control linkage includes an output link having one end thereof mounted on the opposite end of said drag link for pivotal movement about a fourth pivot axis wherein each of said third and fourth pivot axes move along arcuate paths upon rotation of said drive link.

5. The apparatus as claimed in claim 4 including an output shaft, the opposite end of said output link and the one end of said arm being connected to said output shaft to rotate therewith.

6. The apparatus as claimed in claim 1 wherein said gripper mechanism includes a pair of opposing rail members adapted to receive and retain therebetween at least a part of the hinged member upon movement of said vehicle body into the work station.

7. The apparatus as claimed in claim 6 wherein said rail members include outwardly opening jaw portions for guiding the part of the hinged member therebetween.

8. The apparatus as claimed in claim 6 or 7 including a spring mechanism operatively connected to one of said rail members to permit said one rail member to move away from the other rail member upon receiving the part of the hinged member and to bias the part of the hinged member towards the other rail member.

9. The apparatus as claimed in claim 1 wherein said arm includes open and closed positions corresponding to open and closed positions respectively, of the hinged member and wherein said first pivot axis is substantially aligned with the hinge axis and said gripper mechanism retains at least a part of the hinged member in both of said positions whereby the arm and the hinged member go through substantially the same motion between said open and closed positions.

10. The apparatus as claimed in claim 9 wherein said base is adapted to be mounted at the work station so that in the closed position of said arm the longitudinal axis of the arm is substantially parallel to the path taken by the hinged member as the vehicle body moves into the work station.

11. The apparatus as claimed in claim 10 wherein said gripper mechanism includes a pair of elongated rail members the longitudinal axes of which extend parallel to the longitudinal axis of said arm and wherein said rail members receive and retain therebetween at least a part of the hinged member in said closed position upon entry of the vehicle body into the work station.

12. A system for opening and closing hinged members of vehicle bodies at a work station, the system comprising:
a base;
an arm having one end thereof mounted on said base for rotary movement about a first pivot axis;
a gripper mechanism mounted on the free end of said arm and adapted for seizing and releasing the hinged member;
a motor including an actuator shaft rotatable about a second pivot axis spaced apart from the first pivot axis;
control linkage connected to said actuator shaft for transferring the rotary motion of said actuator shaft to rotate said arm, wherein said control linkage translates rotation of said actuator shaft at a substantially constant angular velocity to a rotation of said arm at a substantially sinusoidal angular velocity;
control means for controlling the operation of said motor; and
feedback means associated with said gripper mechanism and said control linkage for providing feedback signals to said control means indicating the condition of the gripper mechanism and the control linkage, respectively, whereby the arm is accelerated and decelerated to move the hinged member in a relatively smooth fashion after said gripper mechanism seizes the hinged member.

13. The system as claimed in claim 12 wherein said feedback includes a switch operatively associated with at least a part of said gripper mechanism to indicate the presence of a part of the hinged member retained in said gripper mechanism.

14. The system as claimed in claim 12 wherein said feedback means includes at least one switch operatively associated with said control linkage to indicate open and closed positions of said arm corresponding to open and closed positions, respectively, of the hinged member.

* * * * *